(12) United States Patent
Bovatsek et al.

(10) Patent No.: US 10,179,374 B2
(45) Date of Patent: Jan. 15, 2019

(54) METHOD AND APPARATUS FOR LASER CUTTING TRANSPARENT AND SEMITRANSPARENT SUBSTRATES

(71) Applicants: James Bovatsek, San Jose, CA (US); Rajesh Patel, Fremont, CA (US)

(72) Inventors: James Bovatsek, San Jose, CA (US); Rajesh Patel, Fremont, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 14/765,074

(22) PCT Filed: Feb. 4, 2014

(86) PCT No.: PCT/US2014/014620
§ 371 (c)(1),
(2) Date: Jul. 31, 2015

(87) PCT Pub. No.: WO2014/121261
PCT Pub. Date: Aug. 7, 2014

(65) Prior Publication Data
US 2015/0367442 A1 Dec. 24, 2015

Related U.S. Application Data

(60) Provisional application No. 61/869,328, filed on Aug. 23, 2013, provisional application No. 61/760,256, filed on Feb. 4, 2013.

(51) Int. Cl.
C03B 33/02 (2006.01)
B23K 26/00 (2014.01)
B23K 26/40 (2014.01)
B23K 103/00 (2006.01)

(52) U.S. Cl.
CPC .......... *B23K 26/0057* (2013.01); *B23K 26/40* (2013.01); *C03B 33/0222* (2013.01); *B23K 2203/50* (2015.10)

(58) Field of Classification Search
None
See application file for complete search history.

(56) References Cited

U.S. PATENT DOCUMENTS

| | | | | |
|---|---|---|---|---|
| 2006/0278619 A1* | 12/2006 | Acker | .................. | C03B 33/091 219/121.67 |
| 2009/0040640 A1* | 2/2009 | Kim | .................. | B23K 26/0604 359/894 |
| 2011/0027972 A1* | 2/2011 | Fukuyo | .............. | B23K 26/0057 438/463 |
| 2012/0211923 A1* | 8/2012 | Garner | .................. | C03B 33/04 264/400 |
| 2012/0223061 A1* | 9/2012 | Atsumi | .............. | B23K 26/0057 219/121.72 |

(Continued)

OTHER PUBLICATIONS

Rezaei. "Burst-train generation for femtosecond laser filamentation-driven micromachining." PhD diss., University of Toronto, 2011.*

*Primary Examiner* — Lisa L Herring
(74) *Attorney, Agent, or Firm* — Brian F. Swienton

(57) ABSTRACT

The present application is directed to a method and apparatus for processing a transparent or semitransparent material with a laser beam resulting in deterministic separation of a single sheet of the material into two or more pieces.

41 Claims, 15 Drawing Sheets

(56) References Cited

U.S. PATENT DOCUMENTS

| | | | | |
|---|---|---|---|---|
| 2012/0255935 | A1* | 10/2012 | Kakui | B23K 26/0042 |
| | | | | 219/121.6 |
| 2012/0261453 | A1* | 10/2012 | Kajikawa | B23K 26/0652 |
| | | | | 225/1 |
| 2013/0126573 | A1* | 5/2013 | Hosseini | B23K 26/0057 |
| | | | | 225/2 |
| 2014/0083983 | A1* | 3/2014 | Zhang | B23K 26/0063 |
| | | | | 219/121.61 |

* cited by examiner

METHOD AND APPARATUS FOR LASER CUTTING TRANSPARENT AND SEMITRANSPARENT SUBSTRATES

CROSS-REFERENCE TO RELATED APPLICATIONS

The present application claims priority to International Patent Appl. Ser. No. PCT/US2014/014620, entitled "Method and Apparatus for Laser Cutting Transparent and Semitransparent Substrates," filed on Feb. 4, 2014, which claims priority to U.S. Provisional Patent Appl. Ser. No. 61/760,256, entitled "Method and Apparatus for Laser Cutting Transparent and Semitransparent Substrates" filed on Feb. 4, 2013, and U.S. Provisional Patent Appl. Ser. No. 61/869,328, entitled "Method and Apparatus for Laser Cutting Transparent and Semitransparent Substrates," filed on Aug. 23, 2013, the contents of which are incorporated by reference in their entirety herein.

BACKGROUND

Transparent and semitransparent substrates are presently used in a vast number of applications. For example, most consumer electronics devices such as cellular phones, "smart" phones, tablet computers and the like include glass, sapphire, and/or glass-like substrates to protect display devices, cameras, and the like. Further, electronic devices incorporating touch-screen technology displays are becoming commonplace. In addition, transparent and semitransparent substrates such as various glasses are frequently used in microelectronics packaging, solar cell manufacturing, aerospace applications, medical devices, manufacturing systems, and the like. As a result, glass substrates are presently manufactured in a wide variety of sizes and shapes with any variety of geometric features formed therein.

Currently, there are a number of processes used to manufacture glass substrates. For example, mechanical drilling, cutting, sand-blasting, and surface polishing are all processes used to some degree for fabricating various features in a glass substrate. While these mechanical processes have proven somewhat useful in the past, a number of shortcomings have been identified. For example, consumable materials are used in mechanical processing. As such, the cost of processing is somewhat variable depending on the cost of consumable materials. In addition, consumption and disposal of such consumables may also be environmentally undesirable or problematic. Further, mechanical processing may be a labor intensive, time consuming process that may not provide the requisite accuracy and precision for many applications.

Increasingly, however, lasers are being used for processing glass or similar transparent/semitransparent substrates. Unlike mechanical processes, the laser-based processing techniques do not require the use of consumable materials. In addition, high-quality laser processes require less post-processing procedures (i.e. polishing, etc.) than mechanical processing. As such, laser-based processing offers a throughput and accuracy advantage over comparable mechanical processing.

Presently, $CO_2$ laser processing is a well-known laser based glass-cutting process, most typically used for cutting glass in straight-lines and curves with very large radii of curvatures (curves with a radius of curvature greater then several centimeters). This process typically uses a $CO_2$ laser to locally heat the glass and a trailing cooling gas jet to cool the glass, resulting in a fracture propagating in the approximate direction determined by relative motion between the glass substrate and the $CO_2$ laser beam/gas jet. Typically, $CO_2$ laser processing is used for crude but fast straight-line cutting of relatively large glass sheets. While $CO_2$ laser processing has proven to be somewhat useful, a number of shortcomings have been identified. For example, cutting intricate shapes, small holes (less than about 200 mm), and curved lines (curves with a radius of curvature of less than about 200 mm) with $CO_2$ laser processes has proven to be problematic.

As a result, alternate laser-based glass cutting systems have been developed. For example, pulsed laser system have been used to create so-called "stealth dicing" cutting processes. These pulsed laser-based cutting processes use pulsed laser sources to create sub-surface modification features (cracks, melt zone, refractive index change) that are used to guide a cleaving fracture along an intended linear path. The very common application of this technology is for dicing of micro-electronic and micro-optical devices built on, for example, crystalline silicon (integrated circuits) and sapphire (light-emitting diodes) wafer substrates. Similar laser-based cutting processes have been developed for cutting high stress, thermally and/or chemically strengthened glass (for example, "Gorilla Glass" manufactured by Corning, Inc., "Dragontrail" manufactured by Asahi Glass, "Xensation" manufactured by Schott, etc.). While the various pulsed laser-based cutting processes have proven somewhat successful in the past a number of shortcomings have been identified. For example, these prior art laser-based cutting processes and systems have been largely unable to efficiently and effectively cut or separate glass along curved paths with small radii of curvature (e.g. radius of curvature of less than about 100 mm).

In light of the foregoing, there is an ongoing need for a method and apparatus for effectively and efficiently cutting transparent and semitransparent substrates in any variety of desired shapes.

SUMMARY

The present application is directed to a method and apparatus for processing a transparent or semitransparent material with a laser beam resulting in deterministic separation of a single sheet of the material into two or more pieces. While the description included herewith discusses cutting glass substrates, those skilled in the art will appreciate that any variety of transparent and semitransparent substrates may be cut in any variety of shapes using the methods and devices described herein. Exemplary substrate materials include, without limitations, glass, strengthen glass, silica-based materials, ceramic polymers, polymeric materials and compounds, Silicon materials, Germanium materials, semiconductor materials and substrates, Sapphire, crystals, and the like. Moreover, the process and devices described herein may be used for straight line cuts and curved lines as well.

More specifically, in one embodiment, the present application discloses a method of cutting a strengthened transparent substrate by positioning a transparent substrate on a work surface and outputting at least one pulsed laser signal from a pulsed laser system. Further, the power profile of the laser signal may be adjusted to form a cutting signal configured to form micro-fractures within the transparent substrate. Thereafter, the cutting signal is directed to the transparent substrate, which forms multiple micro-fractures within the transparent substrate. The micro-fractures are formed between a first surface and second surface of the transparent substrate, wherein the multiple micro-fractures form a cut line in a desired shape within the transparent substrate. Thereafter, breaking force is applied to the transparent substrate to separate the transparent substrate along the desired cut line.

In another embodiment, the present application discloses a method of forming a device body manufactured from a strengthened glass substrate. More specifically, the present application discloses positioning at least one strengthened glass transparent substrate on a work surface and outputting at least one pulsed laser signal from a pulsed laser system. The power profile of the laser signal is adjusted to form at least one cutting signal configured to form micro-fractures within the strengthened glass substrate. Thereafter, the cutting signal is directed to the strengthened glass substrate which forms multiple micro-fractures within the strengthened glass substrate with the cutting signal, the micro-fractures forming at least one cut line defining a device body and a waste area within the strengthened glass substrate. Moreover, in one embodiment, the micro-fractures are formed between a first surface and second surface of the strengthened glass substrate. In addition, at least one separation feature may be formed within the waste area of the strengthened glass substrate with the laser system. Thereafter, at least one separation force is applied to the strengthened glass substrate to separate the device body from the waste area.

In addition, the present application discloses a method of cutting a strengthened transparent substrate which includes the steps of positioning a transparent substrate on a work surface and outputting at least one pulsed laser signal from a pulsed laser system The power profile of the laser signal is adjusted to form at least one cutting signal configured to form micro-fractures within the transparent substrate. In addition, the polarization of the cutting signal is adjusted to form an elliptical cutting signal having a long axis and a short axis. The cutting signal is directed to the transparent substrate, which results in the formation of multiple micro-fractures within the transparent substrate with the cutting signal, the micro-fractures formed between a first surface and second surface of the transparent substrate. The multiple micro-fractures form a cut line in a desired shape within the transparent substrate. Further, the cutting signal may be transposed across the substrate to form a device body within the substrate to form a device body within the substrate wherein the direction of travel of the cutting signal is orthogonal to the long axis of the cutting signal. Thereafter, at least one separation force is applied to the transparent substrate to separate the transparent substrate along a desired cut line.

Other features and advantages of the method and apparatus for laser cutting transparent and semitransparent substrates as described herein will become more apparent from a consideration of the following detailed description.

BRIEF DESCRIPTION OF THE DRAWINGS

Various embodiments of the method and apparatus for laser cutting transparent and semitransparent substrates will be explained in more detail by way of the accompanying drawings, wherein.

DETAILED DESCRIPTION

Figure 1:
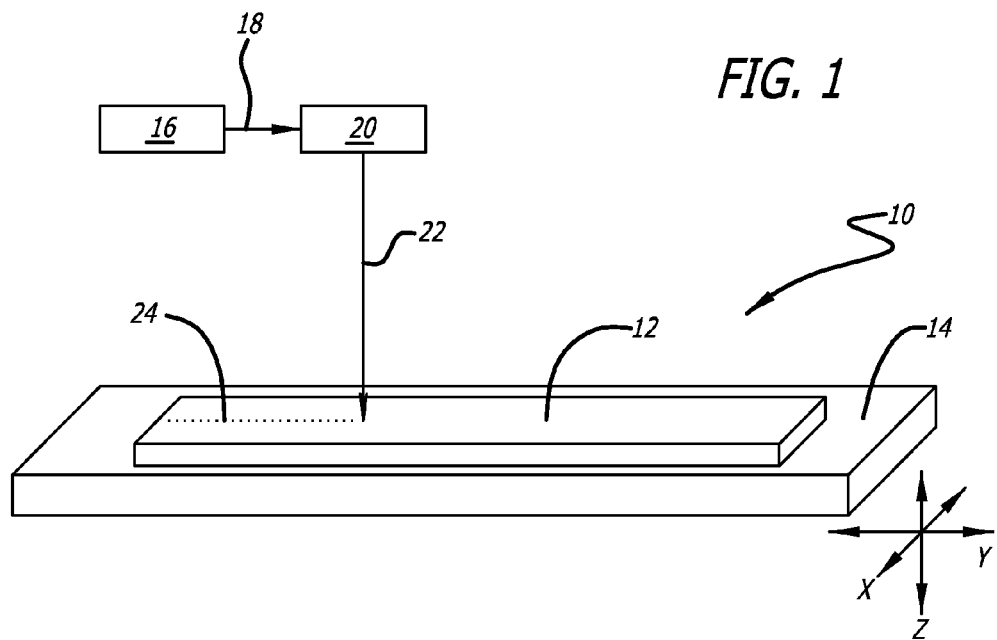
FIG. 1 shows a perspective view of a transparent substrate undergoing the laser cutting method disclosed in the present application.

FIG. 1 shows a perspective view of a transparent substrate undergoing the laser cutting method disclosed in the present application. In the illustrated embodiment, a laser based glass cutting system 10 includes at least one work surface 14 configured to support and position at least one glass substrate 12 undergoing processing. In one embodiment, the work surface 14 comprises a moveable work surface capable of precisely moving the glass substrate 12 along the X axis, Y axis, and/or Z axis, or rotatable about the X axis, Y axis, and/or Z axis. Optionally, the work surface 14 may be stationary. Further, the laser-based glass cutting system 10 includes at least one laser system 16 configured to output at least one laser signal 18 to at least one optics suite 20. In one embodiment, the laser system 16 comprises a high power, hybrid fiber laser configured to output a laser signal 18 at a wavelength of about 50 nm to about 550 nm. For example, the laser system 16 may comprise a Quasar™ laser manufactured by Spectra-Physics, Inc, configured to output a laser signal 18 having an output power of about 0.1 W or more and having a wavelength of about 355 nm. More specifically, in one embodiment the Quasar™ laser is configured to output a laser signal 18 having an output power of about 0.34 W at a wavelength of about 355 nm. Those skilled in the art will appreciate that any variety of laser systems may be used with the present invention. In one embodiment, the laser system 16 is configured to output a laser signal 18 having an output power between about 0.1 W or more. For example, in one embodiment, the laser signal 18 has an output power of about 1 W. In another embodiment, the output power is about 5 W. In still another embodiment, the output power is about 10 to 20 W. In yet another embodiment, the output power is approximately 35 W. Optionally, the output power may be greater than about 35 W. In another embodiment, the laser signal 18 has a wavelength of about 150 nm to about 1600 nm. Optionally, the laser signal 18 may have a wavelength of about 320 nm to about 380 nm. Further, the laser system 16 may be configured to output a pulsed output laser signal 18. For example, in one embodiment the laser system 16 has a repetition rate of about 1 kHz to about 250 kHz. Optionally, the laser system 16 may be configured to output a continuous wave laser signal 18.

Referring again to FIG. 1, at least one optics suite 20 receives the laser signal 18 from the laser system 16. In one embodiment, the optics suite 20 includes at least one optical device therein. Exemplary optical devices include, without limitations, lenses, mirrors, diffractive optical elements, optical filters, polarizers, polarization rotators, polarization adjusters, pocket cells, liquid crystal devices, gratings, beam splitters, beam shapers, beam dumps, apertures, shutters, attenuators, Q-switches, SESAMs, optical mounts, linear motors, single- or multi-axis optical scanners, f-theta objectives, telecentric f-theta objectives, gimbaled mounts, gantries, detectors, cameras, and the like. In one embodiment, the optics suite 20 is configured to receive at least one laser signal 18 and condition or otherwise modify the input laser signal 18 to produce at least one cutting signal 22 directed onto the substrate 12 thereby forming at least one cut line 24 on or within the substrate 12. In the illustrated embodiment, the at least one cutting signal 22 is delivered to the substrate 12 through free space. Optionally, the cutting signal 22 may be delivered to the substrate 12 through at least one enclosed delivery path or articulated beam director system. In yet another embodiment, the cutting signal 22 is delivered to the substrate 12 through one or more fiber optics devices. In the illustrated embodiment the optics suite 20 comprises at least one separate element apart from the laser system 16. Optionally, the laser system 16 and optics suite 20 may be co-located within a single housing. Further, in one embodiment, at least one of the work surfaces 14, the laser system 16 and the optics suite 20 may be configured to be movable along any variety of axes. For example, at least one of the of the work surface 14, the laser system 16 and the optics suite 20 may be configured to move along the X axis, Y axis, and/or Z axis, or rotatable about the X axis, Y axis, and/or Z axis. As such, at least one of the of the work surface 14, the laser system 16 and the optics suite 20 may be positioned on or include at least one user controllable, or computer controlled movable stage, gantry, table, theta stage, linear motor, piezo actuator or the like.

Figure 2:
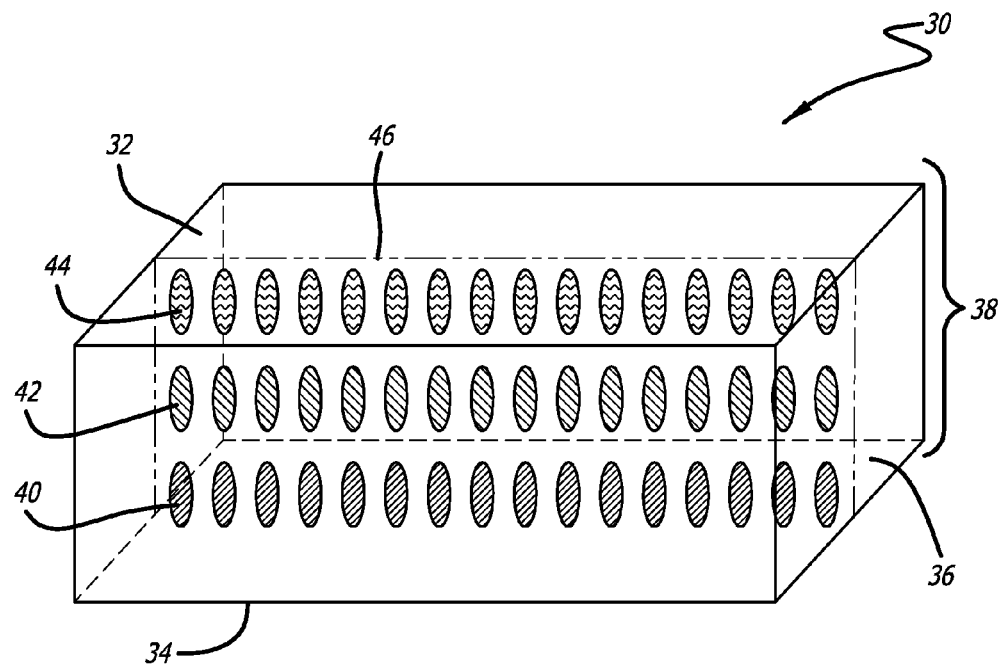
FIG. 2 shows a cross-sectional view of a transparent or semi-transparent substrate having numerous micro-fractures formed therein following processing using the laser system shown in FIG. 1.

FIG. 2 shows a more detailed perspective view of a substrate undergoing the laser cutting method disclosed herein. As shown, the glass substrate 30 includes a first surface 32 and at least a second surface 34. In the illustrated embodiment, the first surface 32 and second surface 34 are opposing. Optionally, the first and second surfaces 32, 34 need not be opposing. An inner core 36 is located between the first and second surfaces 32, 34. In one embodiment, the inner core 36 has a transverse dimension 38 of about 0.05 mm to about 10.00 mm, although those skilled in the art will appreciate that the inner core 36 may have any transverse dimension. In one embodiment, the substrate 30 is manufactured from glass or silica-based materials. In another embodiment, substrate 30 comprises strengthen glass materials. In still another embodiment, the substrate is manufactured from ceramics. Optionally, the substrate 30 may be manufactured from one or more polymers. In another embodiment, substrate 30 may be manufactured from multiple materials. Further, the substrate 30 may comprise a monolithic body or, in the alternative, may comprise a laminated structure.

Referring again to FIG. 2, a series of micro-fractures (40, 42, 44) may be formed within the inner core 36 of the substrate 30. The fractures are "micro" in nature, with sizing in the range of a few micrometers up to a few or several tens of micrometers, depending on the process parameters used. These micro-fractures may be created with an appropriate density and uniformity throughout the glass so as to sufficiently weaken the glass and, by creating a path of least resistance, thereby enabling precise guidance of a fracture that is propagated during the final breaking process.

As shown in FIG. 2, a series of distal micro-fractures 40 are formed within the inner core 36 of the substrate 20 proximate to the second surface 34. Similarly, a series of medial micro-fractures 42 are formed within the inner core 36 of the substrate 20. As shown, a series of proximal micro-fractures 44 are formed within the inner core 36 of the substrate 20 proximate to the second surface 32. In the illustrated embodiment, three (3) series of micro-fractures 40, 42, 44 are formed within inner core 36. Those skilled in the art will appreciate that any number of micro-fractures may be formed within the inner core 36 of the substrate 30. Optionally, micro-fractures may similarly be formed on the first surface 32, second surface 34, or both. The spacing, shape, frequency, and size of the micro-fractures made within the inner core 36 may be varied by adjusting the power, beam size, focal point size, and the like of at least one of the laser system 16 and optics suite 20 (See FIG. 1). For example, the optics suite 20 may be configured to have a numeric aperture suitable for generating a convergence of light or an imagining of light to a dimension of about 0.5 µm to about 50 µm. As such, the micro-fractures 40, 42, 44 may have a transverse dimension of about 1 µm to about 300 µm. Those skilled in the art will appreciate that larger micro-fractures (e.g. having a transverse dimension of about 100 µm or greater) may enable a faster overall substrate cutting process, however, the processed glass cut edge variation will increase, which is generally considered to be lower-quality result. As such, considerable additional and undesirable post-processing may be required. In one embodiment, the micro-fractures 40, 42, 44 will have a transverse dimension of about 10 µm to about 25 µm.

As shown in FIG. 2, the micro-fractures 40, 42, 44 are substantially co-linearly formed on the first surface 32 of the substrate 30, thereby forming a cut or cleave line 46 in any variety of desired shapes, widths, lengths, and the like. In another embodiment, the micro-fractures 40, 42, 44 are not co-linearly arranged, thereby permitting a higher packing density than achievable within co-linear stacking architectures. The ability to control the shape of cut glass is provided by a series of micro-fractures 40, 42, 44 created internally throughout the inner core 36 of the target substrate material 30 by way of the precise positioning of focused laser energy. Those skilled in the art will appreciate that typically the profile of the cutting beam 22 (See FIG. 1) containing sufficient energy to form the microfractures 40, 42, 44 may be circular. In an alternate embodiment, the profile of the cutting beam 22 (See FIG. 1) may be formed in any variety of shapes, such as elliptical and the like. The micro-fractures 40, 42, 44 may be sized and positioned anywhere within the inner core 36 of the substrate 30 such that substrate 30 can be separated along a predetermined cut line 46 with minimal effort and with maximal quality. Higher quality generally implies minimal surface roughness of the cleaved edge and minimal deviation ("wander") of the actual separated edge from the intended line of separation 46.

Figure 3:
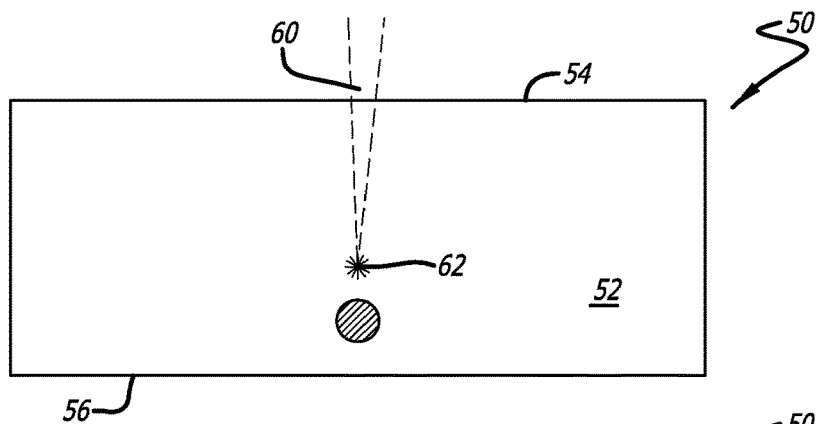
FIG. 3 shows a cross-sectional view of a transparent or semi-transparent substrate having a micro-fracture forming therein during processing using the laser system shown in FIG. 1.
Figure 4:
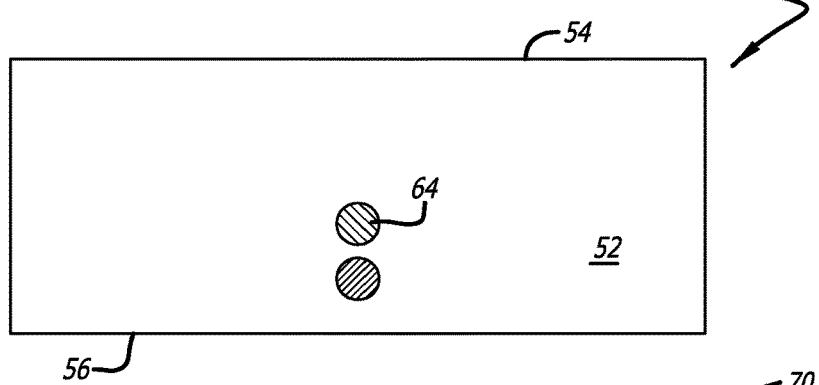
FIG. 4 shows a cross-sectional view of a transparent or semi-transparent substrate having a micro-fracture formed therein following processing using the laser system shown in FIG. 1.

FIGS. 3 and 4 show a process of forming a micro-fracture within the inner core 52 of the substrate 50. As shown in FIG. 3, the inner core 52 is located between the first surface 54 and second surface 56. A distal micro-fracture 58 was previously formed proximate to the second surface 56 of the substrate 50. The pulsed cutting beam 60 is focused at a desired medial location 62 within the inner core 52. As a result, individual micro-fractures 64 are created by the total energy emitted for each cycling of a laser system's output (e.g. beam 18 output by the laser system 16 shown in FIG. 1), which repeats at some deterministic PRF (pulse repetition frequency). For example, a q-switched pulsed laser operating with an output average power of 10 W with a cycling PRF of 100 kHz implies an energy output of 10 W/100 kHz=100 µJ of energy. This energy can be deposited at a rate of 100,000 times per second. Typically, this energy is contained primarily in a single pulse of light; and, thus, is referred to as the "pulse energy" of the laser. One way to characterize how laser pulse energy and laser average power impact material processing tasks is as follows: the amount of pulse energy determines the extent of material modification (ablation, micro-fracture, etc.) that can be effected in the material by the laser; the average power determines how quickly this modification can be done. For example, if a single 100 µJ laser pulse can create the desired micro-fracture dimension, then a 1 W laser emitting this pulse energy does so at a rate of ten thousand per second and thus can create ten thousand micro-fractures per second; similarly, a 20 W laser emitting this same pulse energy can create two hundred thousand such features per second.

Figure 5:
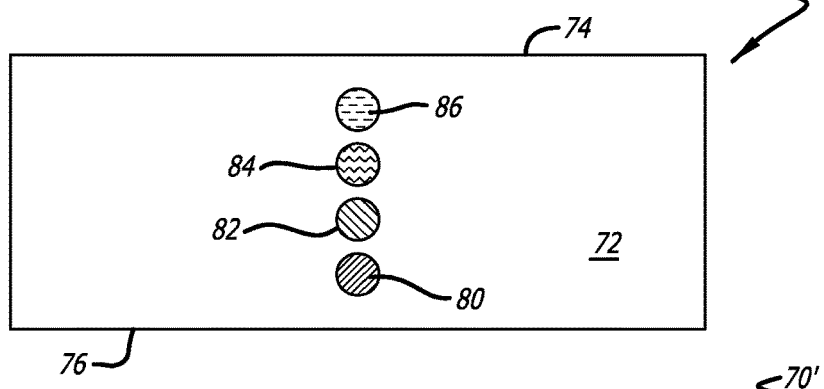
FIG. 5 shows a cross-sectional view of a transparent or semi-transparent substrate having a multiple micro-fractures of a uniform size formed therein following processing using the laser system shown in FIG. 1.
Figure 6:
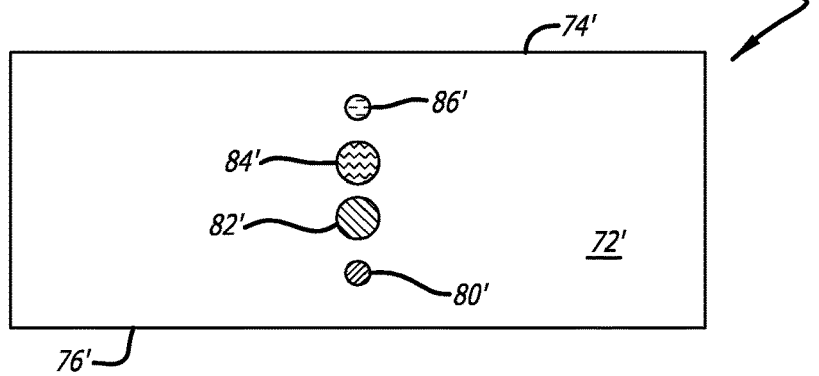
FIG. 6 shows a cross-sectional view of a transparent or semi-transparent substrate having a multiple micro-fractures of a non-uniform size formed therein following processing using the laser system shown in FIG. 1.

FIG. 5 shows a cross-sectional view of a substrate after undergoing the laser cutting process described herein. As shown, the substrate 70 includes an inner core 72 positioned between a first surface 74 and a second surface 76. A series of micro-fractures consisting of at least one distal micro-fracture 80, at least one medial micro-fracture 82, at least one intermediate micro-fracture 84, and at least one proximal micro-fracture 86 have been formed in the inner core 72 of the substrate 70. As shown, the micro-fractures 80, 82, 84, 86 have substantially the same size and shape. In contrast, FIG. 6 shows a cross-sectional view of the substrate 70' having the distal and proximal micro-fractures 80', 86', respectively positioned proximate to the second and first surfaces 76', 74' having a different shape and/or size as the medial micro-fracture 82' and intermediate micro-fracture 84'. As such, those skilled in the art will appreciate that the size and shape of any micro-fractures formed within the substrate may be varied as desired.

Referring again to FIGS. 1 and 2, after the laser cutting process, final separation of the laser-processed substrate 12 can be achieved via various thermal and/or mechanical means. In some cases separation may occur spontaneously as a result of certain stress distributions and/or differences within the material resultant from the laser processing itself. Exemplary separation processes include, but are not limited to, thermal cycling, ultrasound treatment, mechanical punching/cleaving, compressed gas, or vacuum separation. The selected separation process selectively applies sufficient force to the laser-processed substrate 12 to induce separation. The micro-fractures 40, 42, 44 (See FIG. 2) arranged within the substrate 30 with a highest density and uniformity will result in the least force (approaching zero) required to cut the substrate 30 upon completion of the laser processing. In some cases, with a very high density of preferentially arranged micro-fractures within the material, the separation may be induced by slight vibrations and/or accelerations, such as may be generated during routine handling of the material.

If the scanning/cutting direction is considered a Y-axis in 3-dimensional space, and the direction of laser beam propagation through the material is considered an orthogonal Z-axis, then it is appreciated that maximizing the micro-fractures' extent in both the Y- and Z-axis will have the benefit of highest throughput, since this will allow for highest scanning speeds. It is also appreciated that any variation of the micro-fractures along an orthogonal X-axis will tend to increase the cut edge roughness.

Figure 7:
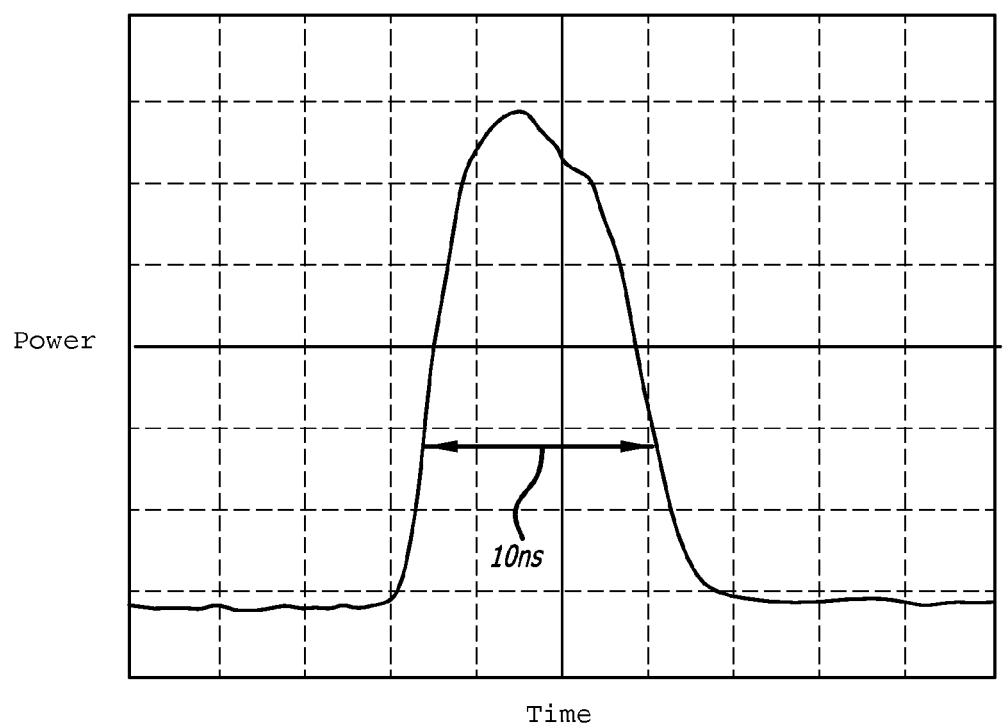
FIG. 7 shows a graph of a power profile (laser power/pulse width) of an output signal of the laser system shown in FIG. 1.
Figure 8:
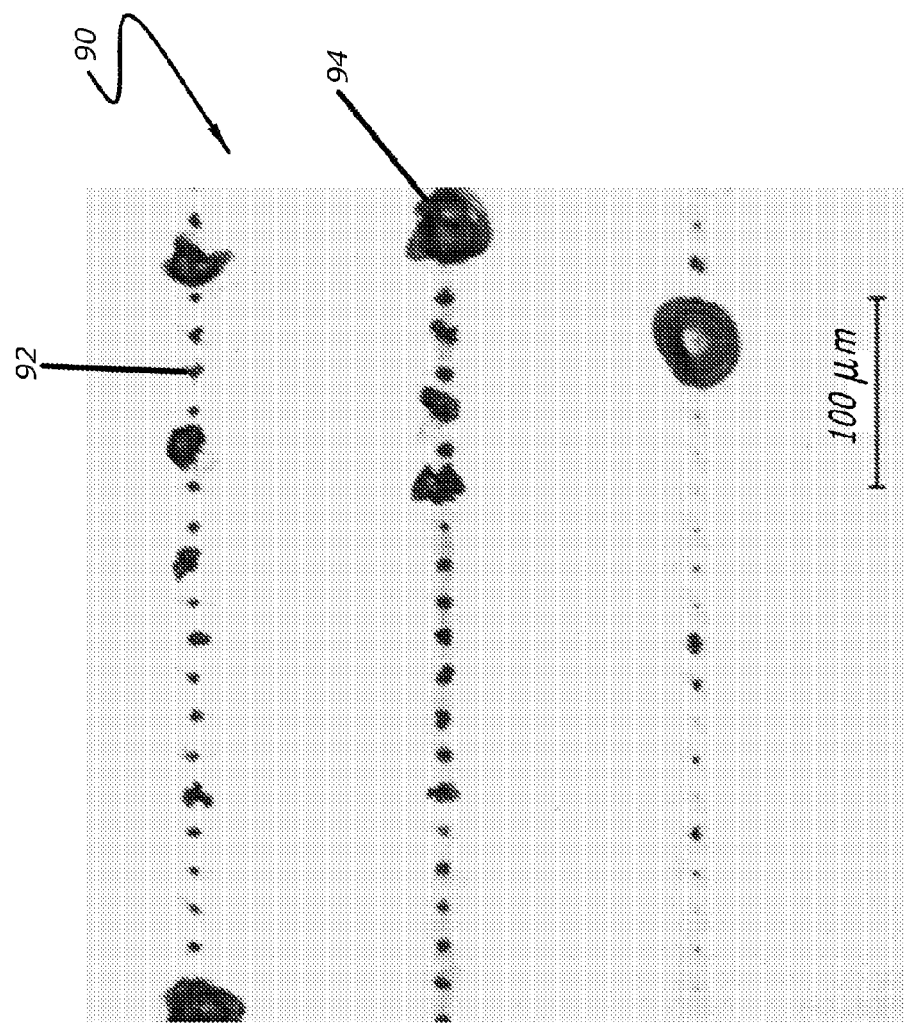
FIG. 8 shows an image of micro-fractures and surface chipping of a transparent or semi-transparent substrate formed using the laser system shown in FIG. 1 outputting a laser signal having the power profile shown in FIG. 7.

For lasers emitting pulses with durations in the nanosecond timescale regime, historically it is difficult to locate micro-fractures very close to the surfaces without coincidentally damaging these surfaces (chipping, cracking, spalling, etc.). For this reason the prior art pulsed laser systems detailed in the Background of the present application intentionally located the focal point of pulsed laser energy within the core of the substrate being processed, isolating the first and second surface of the substrate from the incident laser energy. Previous attempts to locate micro-fractures proximal to either the first and/or second surface of the substrate generally resulted in large (i.e. greater than about 40 µm) undesirable surface chips being generated. Reduction of the pulse energy can somewhat reduce the chipping dimension; however the Z- and Y-extent of the resultant micro-fractures will be substantially reduced. Further, the throughput of the laser cutting process will also be reduced. Further still, the resultant chipping dimensions might still be unacceptable for some application. For example, FIG. 7 shows graphically the power vs. time output of a typical prior art pulsed laser used for cutting glass substrates. FIG. 8 shows the resultant glass surface damage/chipping when this type of pulsed laser output is used for generation of micro-fractures in close proximity to the first surface. As shown, the substrate 90 has numerous first micro-fractures 92 of a first transverse dimension and numerous second micro-fractures 94 having a second transverse dimension several magnitudes larger than the transverse dimension of the first micro-fractures 92.

The surface chipping demonstrated in FIG. 8 is around 50 µm in dimension and may be random along the scanned beam path. Each of the 3 lines depicted in the figure are with a slightly different focusing position of the laser beam relative to the surface of the substrate. FIG. 8 shows a typical result when strong thermal gradients—induced by typical nanosecond-pulsed laser sources used for processing brittle transparent materials such as glass—are generated close to the material's surface.

Figure 9:
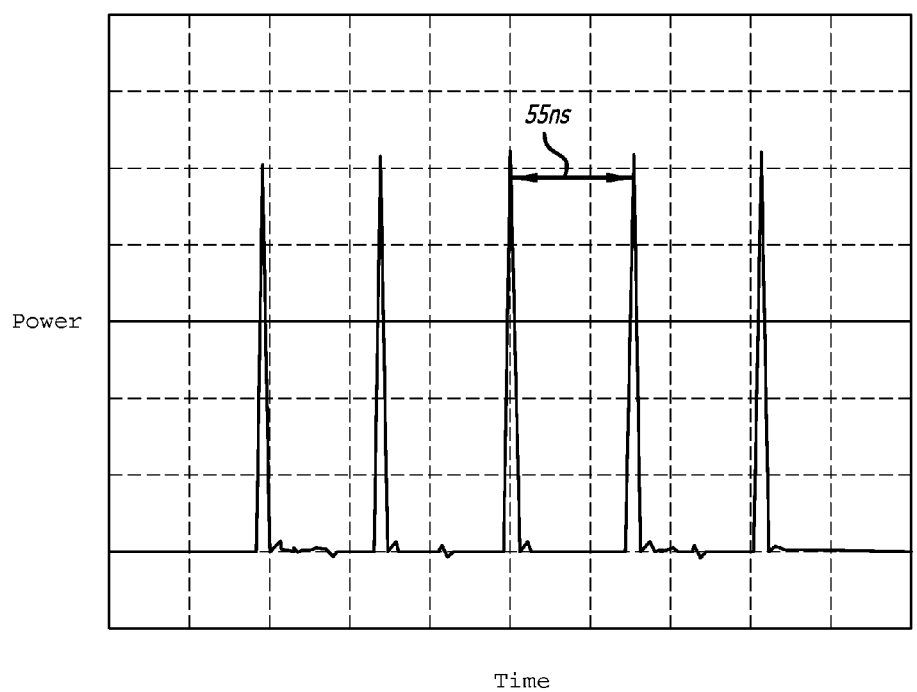
FIG. 9 shows a graph of another embodiment of a power profile (laser power/pulse width) of an output signal of the laser system shown in FIG. 1.
Figure 10:
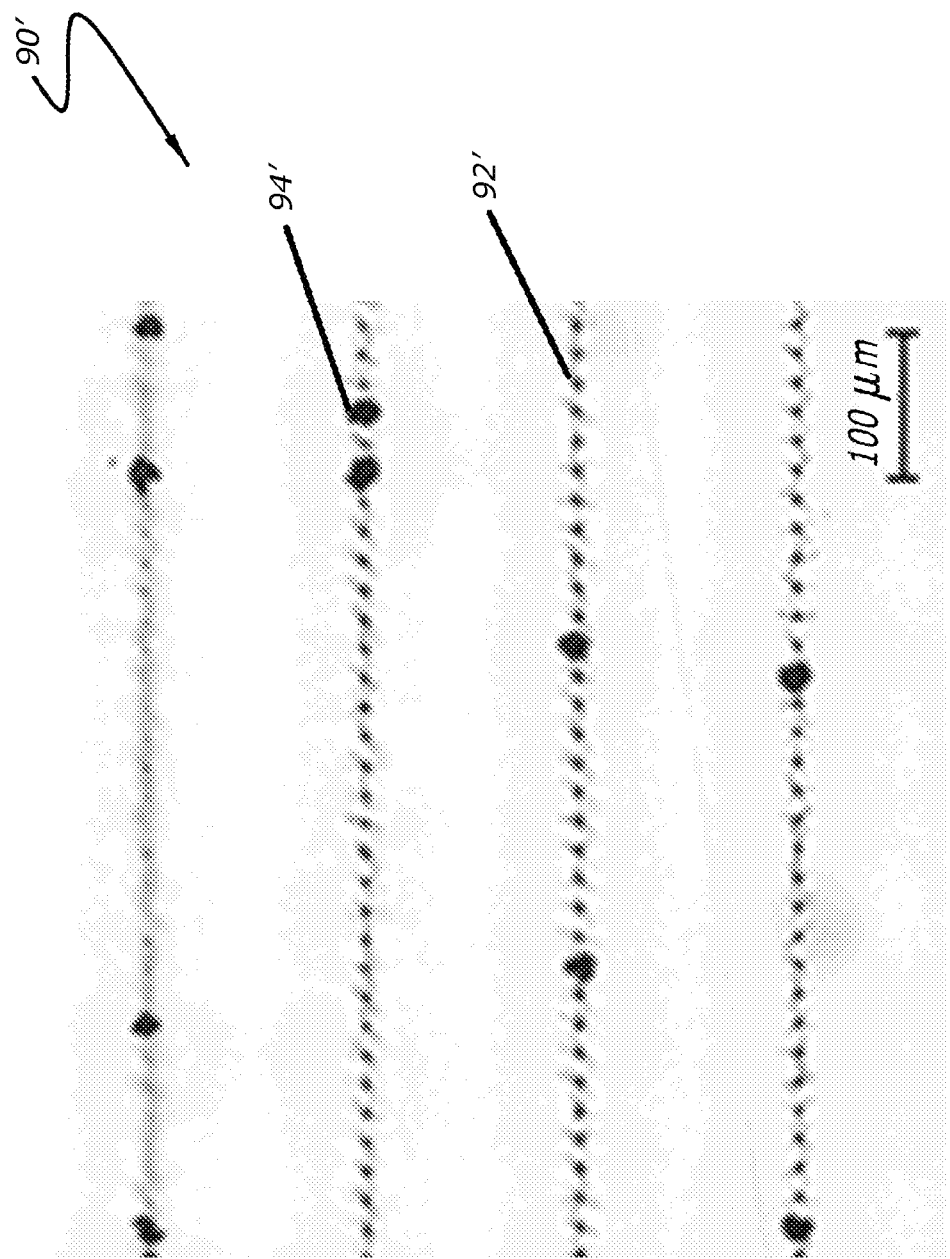
FIG. 10 shows an image of micro-fractures and surface chipping of a transparent or semi-transparent substrate formed using the laser system shown in FIG. 1 outputting a laser signal having the power profile shown in FIG. 9.

In contrast, the apparatus and method described in the present application utilizes a novel power profile (power vs. time) of the energy directed at the substrate to achieve optimal results, particularly when forming micro-fractures proximate to the surfaces of the substrate. More specifically, the alternative technology used in the present application allows for the generation of substantially more than a single laser pulse with each cycling of the laser. For example, if the cycling frequency of the laser system is about 100 kHz, substantially more than 1 pulse of light can be emitted by the laser for every 10 µs cycling interval. Moreover, this technology allows for the digital programming of a tailored power envelope—that is, a temporal interval over which the power vs. time emitted by the laser can be customized with a high degree of flexibility. FIG. 9 shows such a tailored power envelope—comprised of 5 pulses separated by about 55 ns and contained within a temporal window of about 250 ns—as detected by a fast-photodiode power detector and displayed on a high-speed oscilloscope. FIG. 10 shows the reduction in glass chipping evident in the optical microscope image of a substrate using the tailored power envelope shown in FIG. 9. More specifically, the substrate 90' has numerous first micro-fractures 92' of a first transverse dimension and numerous second micro-fractures 94' having a second transverse dimension slightly larger than the transverse dimension of the first micro-fractures 92'. As shown, the second micro-fractures 94' shown in FIG. 10 are several magnitudes smaller than the second micro-fractures 94 shown in FIG. 8. The extent of glass chipping generated by the group of 5 pulses in the 250 ns tailoring window compares favorably to that with the single pulse shown in FIG. 7. The chipping size is reduced by about 50% to about 25 µm. Further the size of the chips is more consistent.

Figure 11:
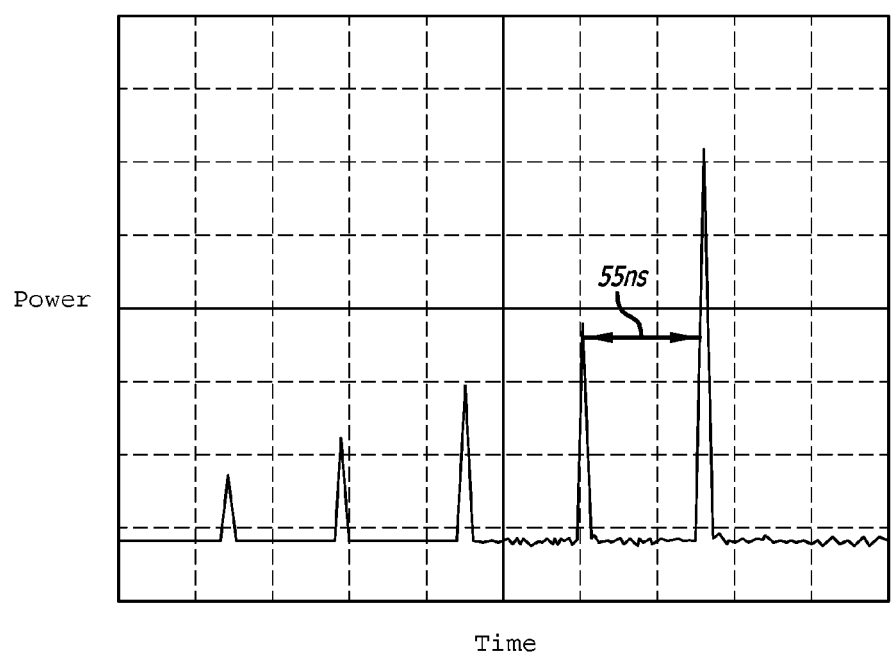
FIG. 11 shows a graph of another embodiment of a power profile (laser power/pulse width) of an output signal of the laser system shown in FIG. 1.
Figure 12:
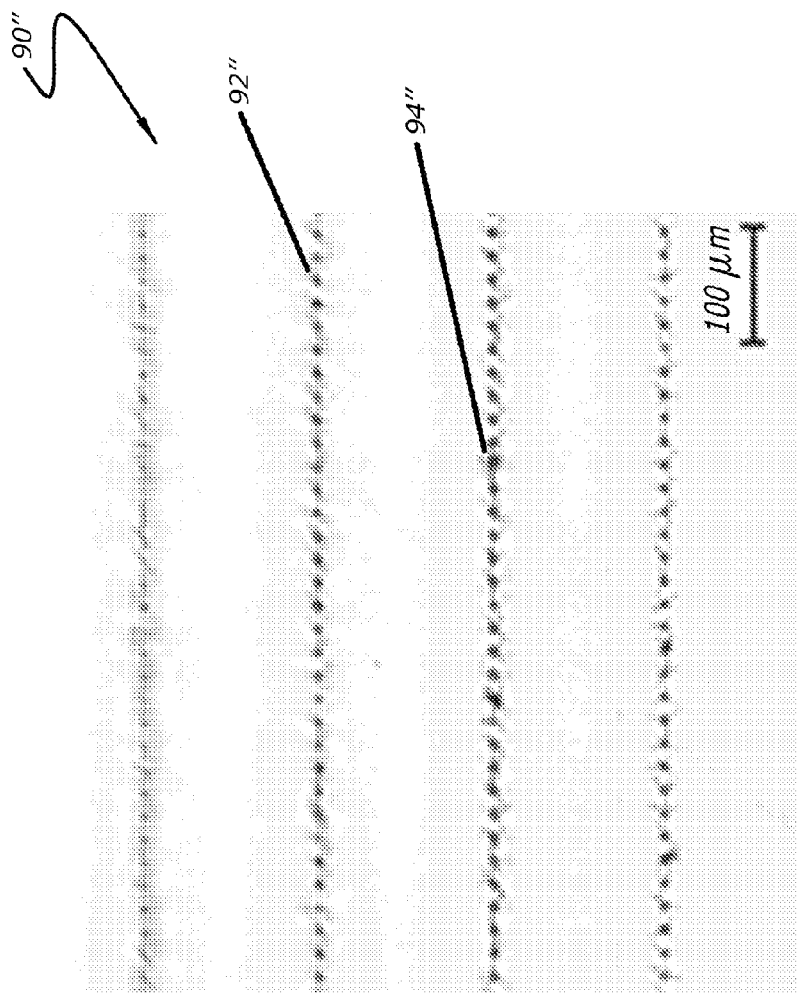
FIG. 12 shows an image of micro-fractures and surface chipping of a transparent or semi-transparent substrate formed using the laser system shown in FIG. 1 outputting a laser signal having the power profile shown in FIG. 11.

FIGS. 11 and 12 show the results of the laser cutting glass process using a tailored power envelope. FIG. 11 shows the output of a laser system capable of emitting a tailored power output envelope. More specifically, FIG. 11 shows graphically the power vs. time with variable pulse power. FIG. 12 shows the optical microscope image of a processed glass substrate using the tailored power envelope shown in FIG. 11. As shown, the laser system configured to output a signal having the tailored output power envelope shown in FIG. 11 offers considerably less undesirable chipping than the prior art laser systems shown in FIGS. 7 and 8.

FIGS. 7-12 demonstrate how tailoring the laser energy output within a specific window of time can offer a demonstrably drastic improvement in surface chipping as compared to a conventional single-pulse process. Those skilled in the art will appreciate that the specific distribution of the power-tailored envelop offering optimal results may, to some extent, depend on the optical and thermal properties of the substrate as well as the various other process parameters, including but not limited to the wavelength of laser radiation, the total energy available within the power-tailored envelope, the size of the focus spot size that is projected towards the substrate, location of the projected focus spot relative to the substrate, and the PRF—or laser cycling time—of the emitted energy. FIG. 12 shows the optimized reduction in chipping as compared with the surface chipping shown in FIGS. 8 and 10. More specifically, substrate 90" has numerous first micro-fractures 92" of a first transverse dimension and numerous second micro-fractures 94" having a second transverse dimension slightly larger than the transverse dimension of the first micro-fractures 92". As shown, the second micro-fractures 94" shown in FIG. 12 are several magnitudes smaller than the micro-fractures 94" shown in FIGS. 8 and 10.

Figure 13:
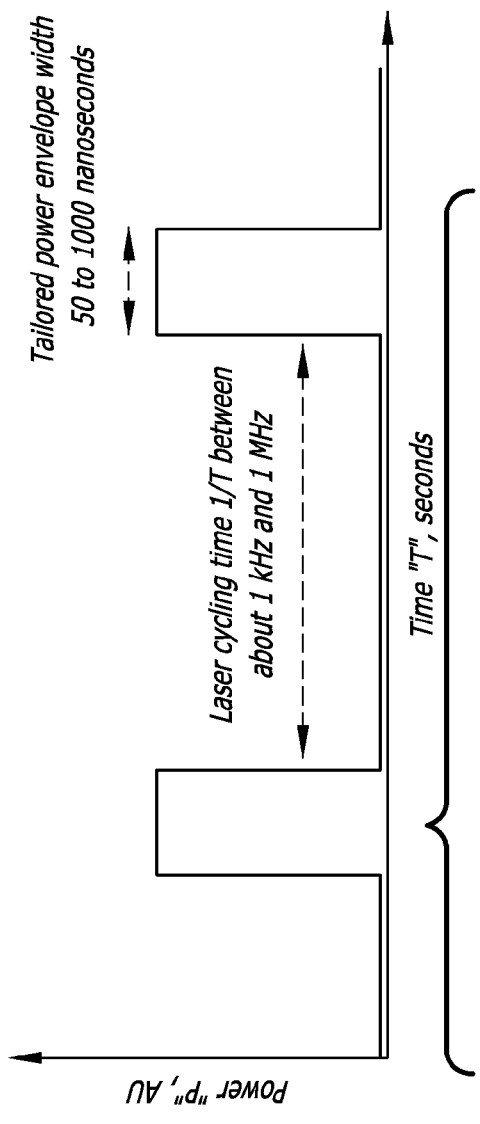
FIG. 13 shows a graph of an embodiment of a laser signal output by the laser system shown in FIG. 1 having a tailored pulse envelope.
Figure 14:
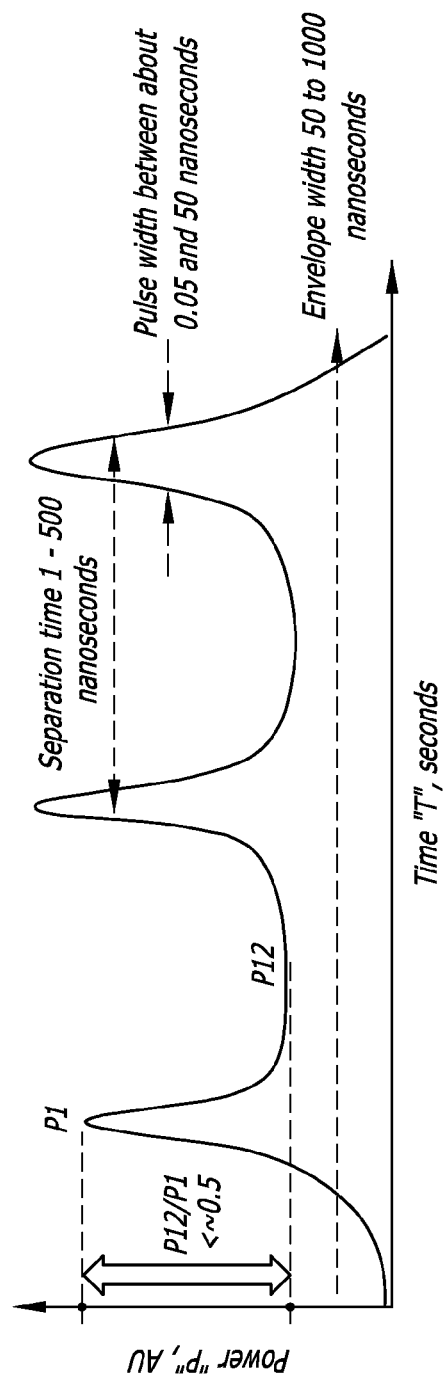
FIG. 14 shows a graph of an embodiment of a laser signal output by the laser system shown in FIG. 1 having another tailored pulse envelope.

In one embodiment, the envelope containing the emitted laser energy, which is repeated at some laser cycling frequency, may contain between 2 and 100 pulses of light, each having FWHM (full-width half maximum) temporal width of >0.0005 nanoseconds (hereinafter ns) or more and less than 500 ns, the power maxima of which are temporally separated by a time of greater than about 1 ns and not more than about 1000 ns, and which are contained within a tailored envelope having a temporal dimension of between about 1 ns and 1000 ns. The laser cycling frequency may be between about 1 Hz and about 10000 kHz. Those skilled in the art will appreciate that in some embodiments, the power between adjacent pulses may not revert to a value of approximately zero; but rather the power between adjacent pulses may merely decrease by a percentage substantially near to about 50% of the preceding pulse's maximum. In this case, it may also be considered that the emitting energy may be tailored as one or more pulses, each of which does not smoothly and monotonically rise and then fall to and from a maximum of power; rather, the one or more pulses in the envelope is modulated such that there are at least two power maxima, each separated by some temporal length of between about 1 ns and about 1000 ns, in which the power has decreased by an amount substantially close to about 50% of the preceding maxima. FIGS. 13 and 14 graphically illustrate the parameters of the tailored pulse envelope described above.

Figure 15:
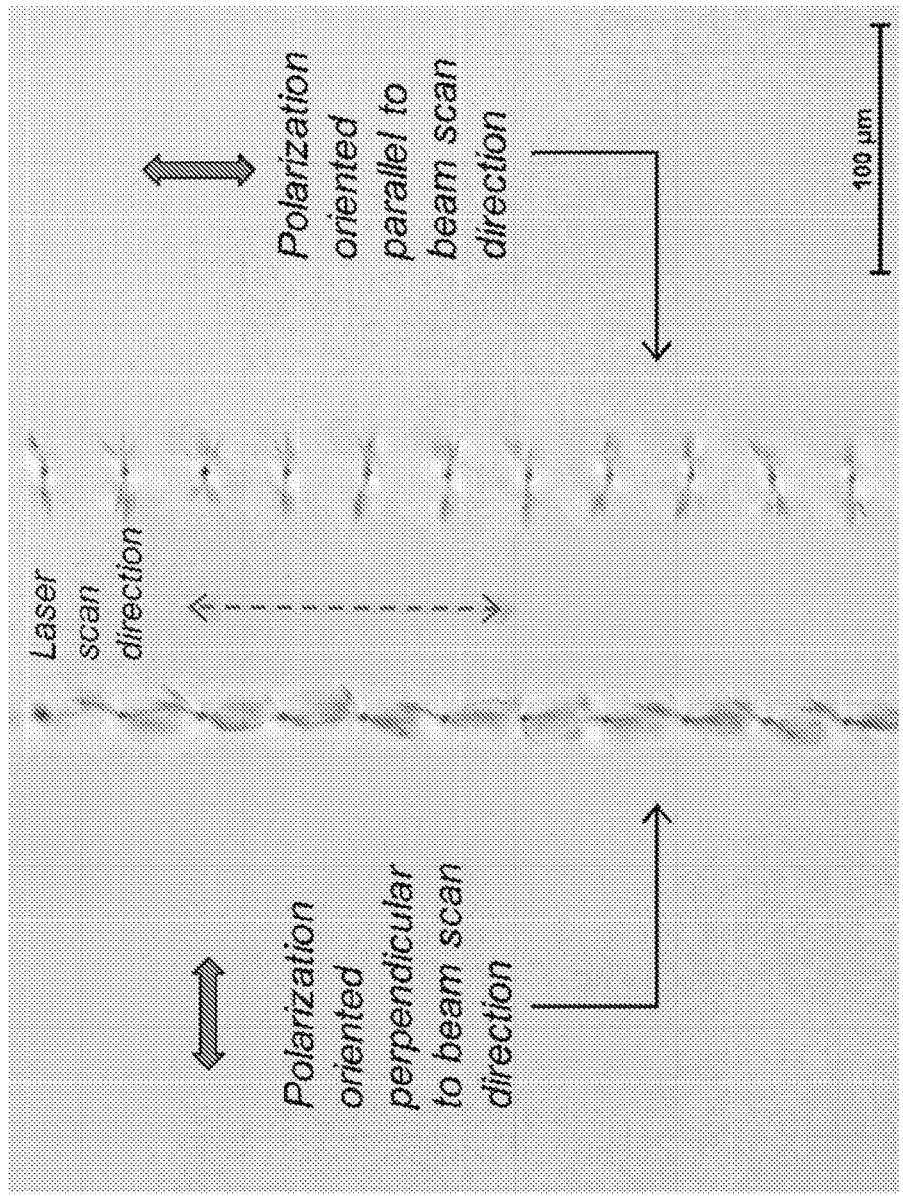
FIG. 15 shows an image of micro-fractures and surface chipping of a transparent or semi-transparent substrate formed by controlling the polarization vector orientation on the orientation of the micro-fractures using the laser system shown in FIG. 1.

Optionally, the polarization of the incident laser beam may be varied or changed to generate the highest processing throughput and highest quality of result in terms of, for example, cleaved sidewall surface roughness, cut-edge deviation from an intended cut line, etc. Those skilled in the art will appreciate that the ability to effect preferential orientation of the micro-fractures would allow for higher processing speeds and less edge variation if the micro-fractures could be oriented such that they extend to a larger degree along the intended cutting direction—the same direction as the relative motion between the laser beam and the target material—and to a lesser extent in the direction perpendicular. Such an orientation can be realized if the laser polarization (orientation of the electric field vector of the incident laser pulses) is linear and oriented substantially perpendicular to the intended cutting direction and substantially parallel to the substrate's surface. As a more general statement, a desired micro-fracture orientation is achieved when the irradiating laser energy has an elliptical polarization (defined as having a major- and a minor-axis component to the electric field of the laser radiation) oriented such that the major axis of the polarization ellipse is substantially perpendicular to the cutting direction and substantially parallel to the material's surface. As a unique and ideal scenario for ideal micro-fracture orientation, the minor axis of the elliptical polarization will have a value of approximately zero; and hence the beam is approximately linearly polarized with the polarization oriented orthogonal to the intended cutting direction and parallel to the surface of the material. FIG. 15 demonstrates the effect of controlling the polarization vector orientation on the orientation of the micro-fractures. It is appreciated by those skilled in the art that other parameters might impact the orientation of the micro-fractures. For example, a laser beam with a certain ellipticity may be used to induce a preference in the orientation of the micro-fractures. Such parameters can be used complementary to the polarization control described herein.

As shown in FIG. 6, a number of advantages may be realized by orienting the micro-fractures along the direction of the intended cut. For example, the micro-fractures generated per each cycling of the laser's output can be placed immediately adjacent to each other—which is beneficial for easy separation after the laser processing—at higher rates of speed for a given laser cycling time or PRF. Further, the cut edge will have a smaller amount of deviation from the intended cut path as there is less extension of stress concentrators away from the intended cut direction. Moreover, the finished product cut with the ideal micro-fracture orientation is likely to have greater impact resistance, bending strength, etc., compared to the non-ideal orientation, due to the lesser extent of stress propagation pathways into the body of the part. Optionally, the laser system may be configured to output an optical signal having circular polarization (a special case of elliptical polarization, which has ellipticity equal to 1), which may tend to homogenize the orientation of the micro-fractures with respect to the intended cutting path in some applications. Further, those skilled in the art will appreciate that there exists in the marketplace certain optical components which are capable of rapidly and precisely adjusting the polarization state (orientation, ellipticity, etc.) of a laser beam based on an input signal such as a user-controlled analog or digital voltage or current signal, thus allowing one to maintain a preferred polarization state and orientation (and, hence, preferred micro-fracture orientation) along, for example, the entire perimeter of a curve, circular, elliptical, etc. cutting line. It is further appreciated that for intended cutting pathways having a circular symmetry such as circles and ellipses, it may be preferential to interleave micro-fractures with the use of two distinct and separate scans of the laser beam (or analogous translation of the material), each of which is executed with a polarization orientation that is (1) substantially parallel to the material's surface, and (2) orthogonal to each other. That is, a two-step process may be used in which micro-fractures are formed along the same curved path, but with the polarization orientation rotated approximately 90 degrees between the two steps.

Figure 16:
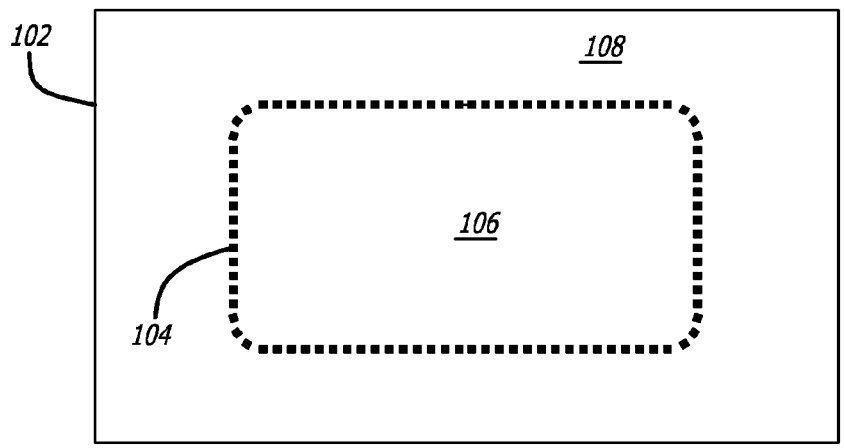
FIG. 16 shows a perspective view of an embodiment of an auto-cleaving process for forming a device body with a transparent or semi-transparent substrate using the laser system shown in FIG. 1.
Figure 17:
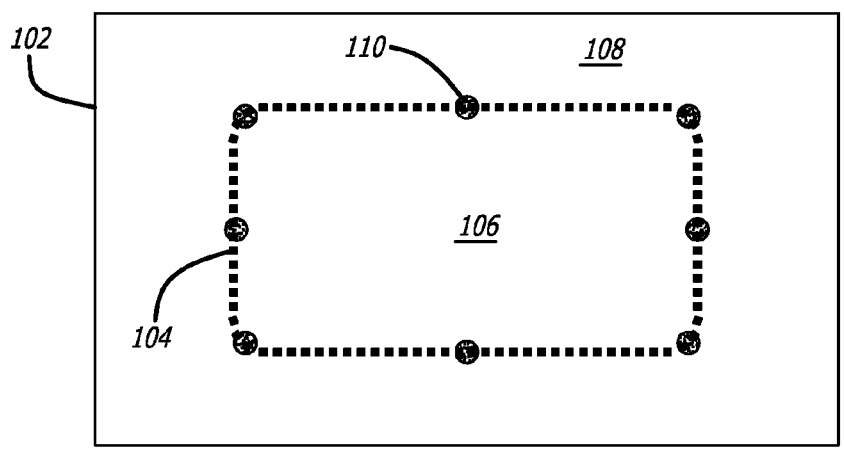
FIG. 17 shows a perspective view of an embodiment of an auto-cleaving process for forming a device body with a transparent or semi-transparent substrate using the laser system shown in FIG. 1 wherein a cut line and auto-cleaving features are formed on the substrate.
Figure 18:
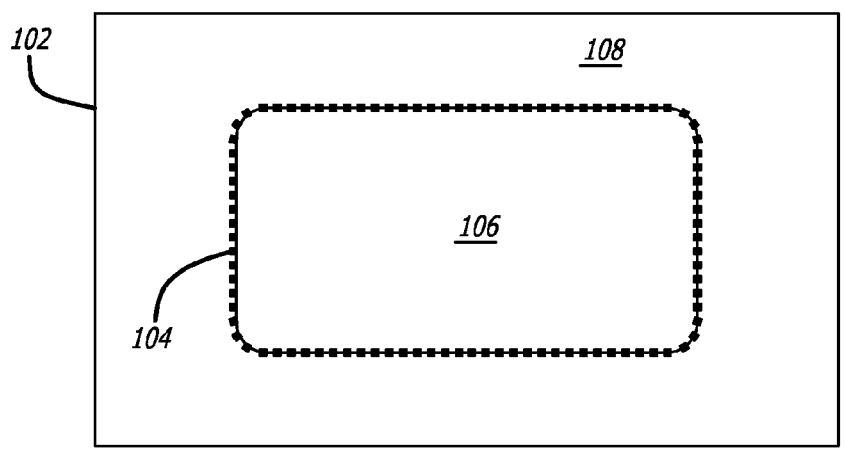
FIG. 18 shows a perspective view of an embodiment of an auto-cleaving process for forming a device body with a transparent or semi-transparent substrate using the laser system shown in FIG. 1 wherein a device body is being separated from the waste area of the substrate.

FIGS. 16-18 show an embodiment of a laser auto-cleaving process for use in processing glass, transparent, and/or semi-transparent substrates. FIG. 16 shows a transparent substrate 102. In one embodiment, the substrate 102 comprises a glass substrate. In another embodiment, the substrate 102 comprises a strengthened glass substrate. Optionally, the substrate 102 may be comprised of one or more silica materials, ceramics, Sapphire, polymers, aerogels, semiconductor materials, transparent materials, semi-transparent materials, and the like.

Referring again to FIG. 16, at least one device body 106 is defined by at least one cutline 104. As such, at least one device body 106 and at least one waste area 108 are formed on the substrate 102. In one embodiment, the cut line 104 comprises a series micro-fractures as described above and shown in FIGS. 1-5. In one embodiment, the micro-fractures forming the cut line 104 are positioned within the body of the substrate 102. Those skilled in the art will appreciate that the micro-fractures forming the cut line 104 may be formed anywhere within the substrate 102. As described, in one embodiment, the micro-fractures forming the cut line 104 are configured to modify the internal structure of the substrate 102. As such, material may or may not be removed from the substrate 102, rather a micro-fracture is formed within the body of the substrate 102.

Figure 19:
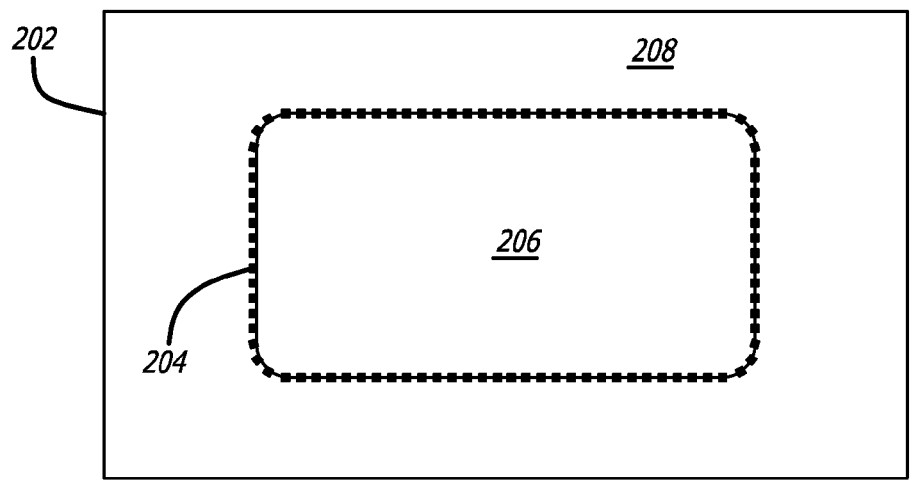
FIG. 19 shows a perspective view of an exemplary method of separating features or devices formed in transparent or semi-transparent substrates using the method and apparatus described herein, wherein a device body and a waste area are formed within the substrate using the laser system shown in FIG. 1.

As shown in FIG. 17, once the cut line 104 is formed, a series of auto-cleaving features 110 are formed at various locations on the substrate 102 on or proximate to the cut line 104. In one embodiment, the auto-cleaving features 110 are configured to create regions of slight separation between the device body 106 and the waste area 108. In one embodiment, the separation regions are formed by the introduction of thermal stress resulting from the application of laser energy to an area on or proximate to the cut line 104 during the formation of the auto-cleaving features 110. In one embodiment, the separation regions separate the device body 106 from the waste area 108. In another embodiment, the separation regions separate only portions of the device body 106 from the waste area 108. As shown in FIG. 18, once the auto-cleaving features 110 are formed, the substrate 102 may undergo separation processing. FIGS. 19-26 show two exemplary methods of separating features formed in transparent or semi-transparent substrates using the methods and apparatus for described herein. As shown in FIG. 19, a master substrate 202 is irradiated with the laser system described above. In one embodiment, at least one device profile cut line 204 comprised of multiple micro-fractures is formed in the substrate 202 thereby defining at least one at least one device body 206 and at least one waste area 208. In the alternative, a single continuous macro fracture or a plurality of continuous macro fracture segments along or significantly proximal to the intended profile cut line may be formed in the substrate 202 thereby defining at least one at least one device body 206 and at least one waste area 208. As described above, the cut line may be formed in any variety of shapes and sizes.

Figure 20:
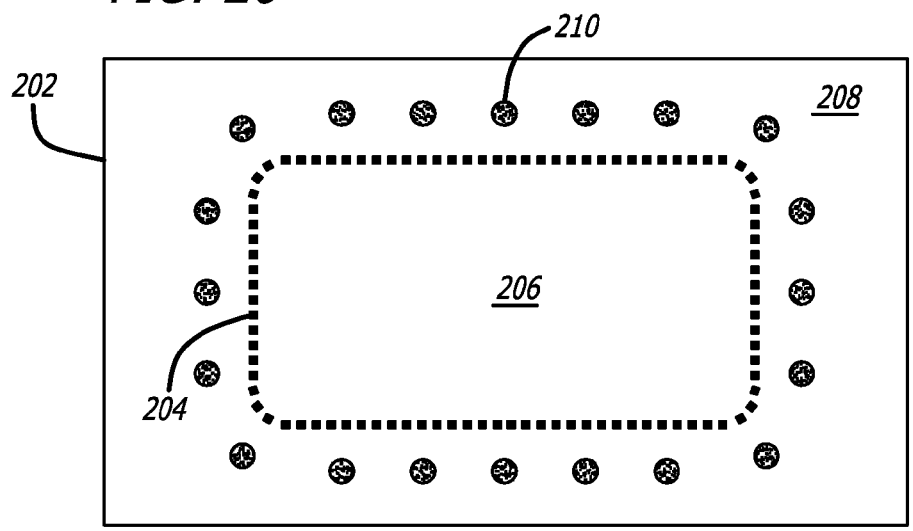
FIG. 20 shows a perspective view of the formation of separation features in the waste area formed on a substrate using the method and apparatus described herein, wherein the separation features are formed within the substrate using the laser system shown in FIG. 1.

As shown in FIG. 20, thereafter, one or more supplemental separation features 210 may be formed within the waste area 208 with the laser system. In one embodiment, the separation features are located distally from the cut line 204. In another embodiment, the separation features are located proximal to the cut line 204. Further, the separation features 210 may be linearly formed, non-linearly formed, and/or randomly formed within the waste area 208. In one embodiment, at least one of the separation features 210 formed in the waste area 208 has a larger transverse dimension than the micro-fractures forming the cut line 204 (See FIG. 2, micro-fractures 40, 42, 44). Optionally, at least one of the separation features 210 may have a smaller transverse dimension the micro-fractures forming the cut line 204. Further, the separation features 210 may be formed in any variety of shapes and sizes are desired to enable effective separation of the device body 206 from the waste area 208.

Figure 21:
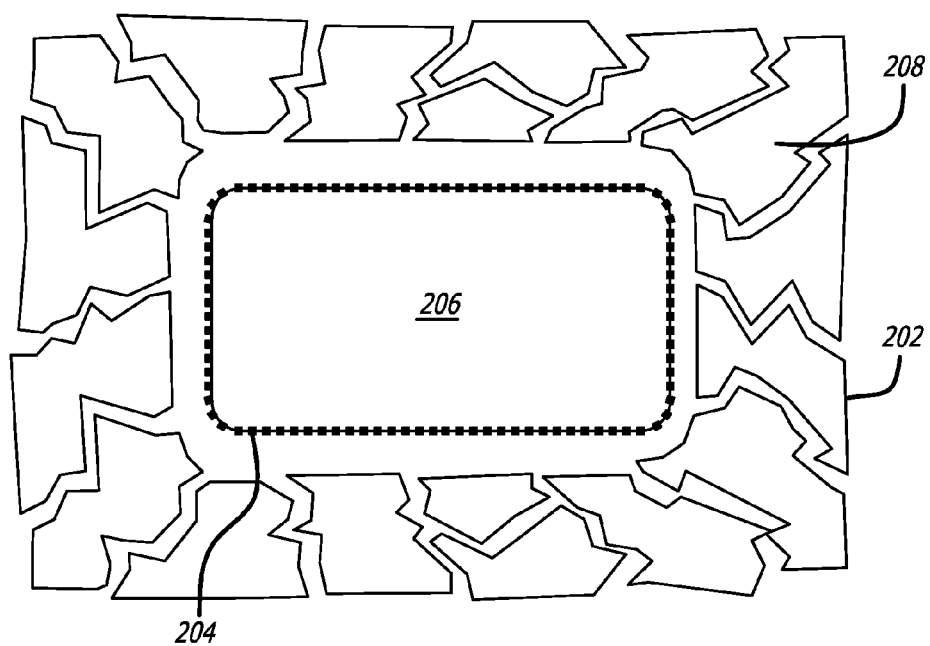
FIG. 21 shows a perspective view of the separation process of a device body formed on a substrate using the method and apparatus described herein.
Figure 22:
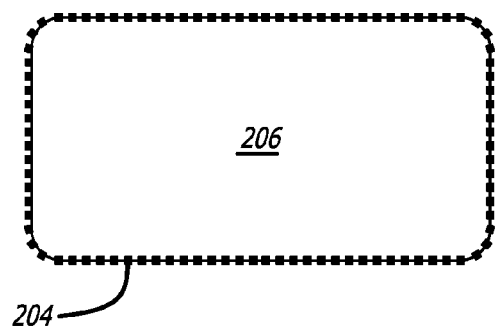
FIG. 22 shows a perspective view of a device body formed using the auto-cleaving process and laser cutting process described in the present application.

Thereafter, as shown in FIG. 21, the device body 206 may be separated from the waste area 208 using any variety of methods. For example, in one embodiment, the cut line 204 and separation features 210 formed in the waste area 208 are subjected to thermal stress thereby resulting in the desired propagation of the fracture along the cut line 204 forming the device body 206, as well as at least one separation fracture of the substrate 202 within the waste area 208. In another embodiment, a mechanical separation force is applied to the separation features 210 within the waste area 208. Exemplary separation forces include, without limitations, laser-induced or otherwise induced thermal stress, vibrations, sonic waves, and the like. Further, in some embodiments, the separation of the device body 206 and waste area 208 occurs without the application of a separation force. In the illustrated embodiment, the separation fracture may be random within the waste area 208. In another embodiment, the separation fracture within the waste area is not random. As shown in FIG. 22, the device body 206 having the desired shape is provided following the application of the separation force.

Figure 23:
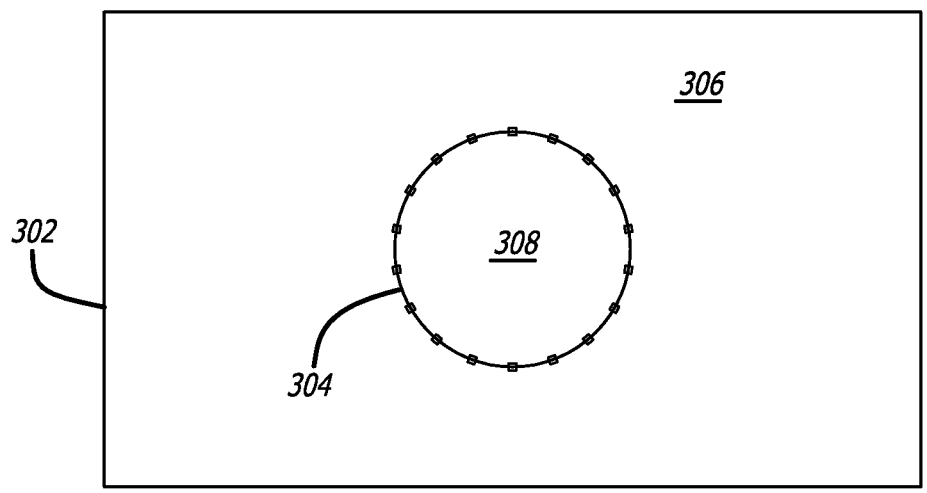
FIG. 23 shows a perspective view of an exemplary method of separating features or devices formed in transparent or semi-transparent substrates using the method and apparatus described herein, wherein a device body and a waste area are formed within the substrate using the laser system shown in FIG. 1.
Figure 24:
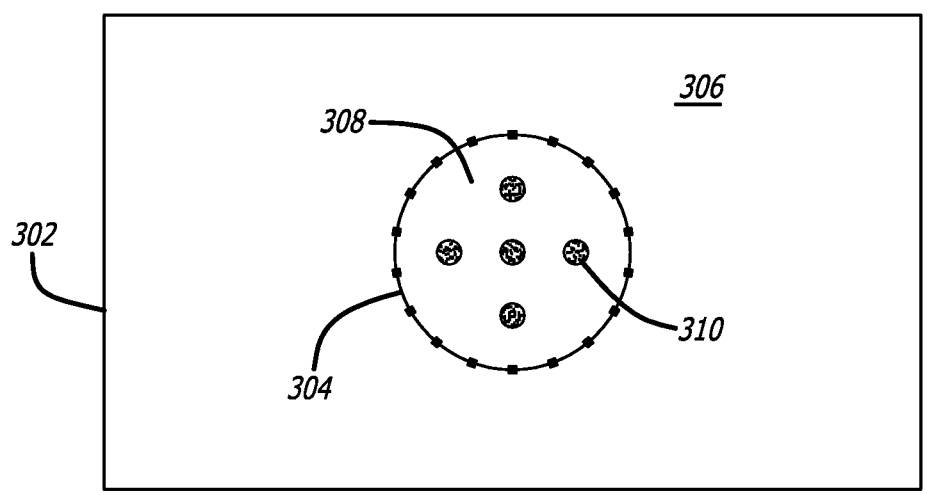
FIG. 24 shows a perspective view of the formation of separation features in the waste area formed on a substrate using the method and apparatus described herein, wherein the separation features are formed within the substrate using the laser system shown in FIG. 1.
Figure 25:
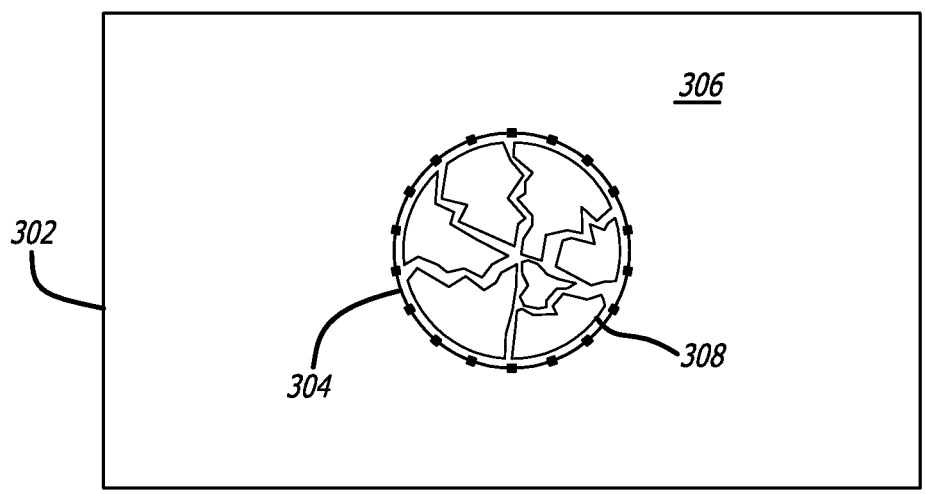
FIG. 25 shows a perspective view of the separation process of a device body formed on a substrate using the method and apparatus described herein.
Figure 26:
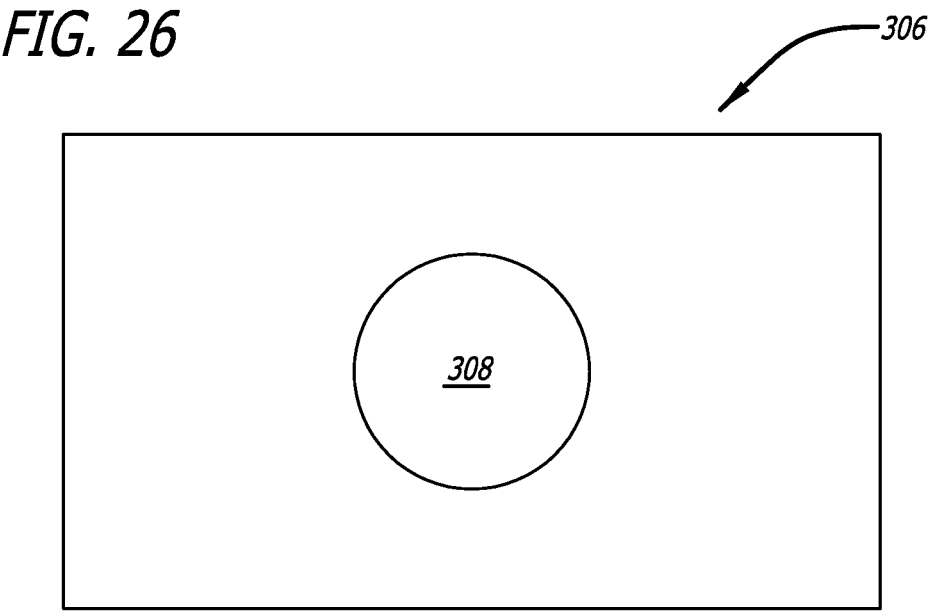
FIG. 26 shows a perspective view of a device body formed using the auto-cleaving process and laser cutting process described in the present application.

Similarly, FIGS. 23-26 show one method of forming at least one feature within substrate using the separation technique described above. As shown in FIG. 23, one or more cut lines 304 are formed within the substrate 302. In the illustrated embodiment, the cut line 304 forms at least one device body 306 having at least one waste area 308 formed therein. As shown in FIG. 24, one or more separation features 310 are formed within the waste area 308. Thereafter, at least one separation force is applied to at least one of the cut line 304 and/or the separation features 310 formed in the waste area 308 as shown in FIG. 25. FIG. 26 shows the resulting device body 306 post separation of the waste are 308 from the substrate 302.

The embodiments disclosed herein are illustrative of the principles of the invention. Other modifications may be employed which are within the scope of the invention. Accordingly, the devices disclosed in the present application are not limited to that precisely as shown and described herein.

What is claimed is:

1. A method of laser cutting transparent and semi-transparent substrates, comprising:
    positioning at least one substrate on a work surface;
    outputting multiple nanosecond pulsed laser signals from a pulsed laser system, each nanosecond pulsed laser signal having a power envelope;
    adjusting at least one power profile within the power envelope of at least one nanosecond pulsed laser signal to form at least one nanosecond cutting signal, wherein a first pulse of the multiple pulsed nanosecond pulsed laser signal has a lower power than at least a second pulse of the multiple pulsed nanosecond pulsed laser signal;
    directing the at least one nanosecond cutting signal to the at least one substrate;
    forming multiple micro-fractures within the at least one substrate with the at least one nanosecond cutting signal, the multiple micro-fractures formed between a first surface and second surface of the at least one substrate wherein the power profile within the power envelope of the at least one nanosecond cutting signal is configured to be selectively adjusted to form individual micro-fractures, the multiple micro-fractures forming at least one cut line within the at least one substrate; and
    separating the at least one substrate along at least one cut line.

2. The method of claim 1 wherein the at least one substrate comprises a strengthened glass substrate.

3. The method of claim 1 wherein the at least one substrate comprises a non-strengthened glass substrate.

4. The method of claim 1 wherein the at least one substrate comprises a sapphire substrate.

5. The method of claim 1 further comprising selectively moving at least one of the at least one substrate and the pulsed laser system thereby permitting the at least one nanosecond cutting signal to controllably traverse a surface of the at least one substrate.

6. The method of claim 1 further comprising moving the pulsed laser system about at least one of the X axis, Y axis, and Z axis.

7. The method of claim 1 further comprising rotating the pulsed laser system about at least one of the X axis, Y axis, and Z axis.

8. The method of claim 1 further comprising moving the at least one substrate positioned on the work surface about at least one of the X axis, Y axis, and Z axis.

9. The method of claim 1 further comprising rotating the at least one substrate positioned on the work surface about at least one of the X axis, Y axis, and Z axis.

10. The method of claim 1 further comprises forming one or more distal micro-fractures within the at least one substrate, the one or more distal micro-fractures formed proximal to a second surface of the at least one substrate, the second surface of the at least one substrate positioned proximal to the work surface.

11. The method of claim 1 further comprises forming one or more medial micro-fractures within the at least one substrate, the one or more medial micro-fractures formed centrally within the at least one substrate between the first and second surfaces of the at least one substrate.

12. The method of claim 1 further comprises forming one or more proximal micro-fractures within the at least one substrate, the one or more proximal micro-fractures formed proximal to a first surface of the at least one substrate, the first surface of the at least one substrate positioned distally from the work surface.

13. The method of claim 1 further comprises:
forming one or more distal micro-fractures within the at least one substrate, the one or more distal micro-fractures formed proximal to a second surface of the at least one substrate, the second surface of the at least one substrate positioned proximal to the work surface;
forming one or more medial micro-fractures within the at least one substrate, the one or more medial micro-fractures formed centrally within the at least one substrate between the first and second surfaces of the at least one substrate; and
forming one or more proximal micro-fractures within the at least one substrate, the one or more proximal micro-fractures formed proximal to a first surface of the at least one substrate, the first surface of the at least one substrate positioned distally from the work surface.

14. The method of claim 1 further comprising irradiating the at least one substrate with at least one nanosecond cutting signal having an elliptical polarization.

15. The method of claim 14 further comprising adjusting a minor axis of the at least one elliptically-polarized nanosecond cutting signal to have a value of about zero.

16. The method of claim 14 further comprising adjusting at least one of a minor axis and major axis of the at least one elliptically-polarized nanosecond cutting signal to have a value of about one.

17. The method of claim 1 further comprising adjusting a polarization of the at least one nanosecond cutting signal to approximate a circularly polarized signal.

18. The method of claim 1 further comprising adjusting a polarization of the at least one nanosecond cutting signal to approximate a linearly polarized signal.

19. The method of claim 5 further comprising:
adjusting a polarization of the at least one nanosecond cutting signal to approximate a linearly polarized cutting signal;
controllably moving at least one linearly polarized nanosecond cutting signal across the at least one substrate wherein the direction of travel of the at least one linearly polarized nanosecond cutting signal is orthogonal to the polarization of the at least one linearly polarized nanosecond cutting signal; and
controllably adjusting the orientation of the linear polarization of the at least one linearly polarized nanosecond cutting signal to maintain the polarization at an orthogonal angle to the cutting direction while moving the at least one linearly polarized nanosecond cutting signal across the at least one substrate.

20. The method of claim 5 further comprising:
adjusting a polarization of the at least one nanosecond cutting signal to approximate a linearly polarized nanosecond cutting signal;
controllably moving the linearly polarized nanosecond cutting signal across the at least one substrate wherein the direction of travel of the linearly polarized nanosecond cutting signal is parallel to the polarization of the linearly polarized nanosecond cutting signal; and
controllably adjusting the orientation of the linear polarization of the linearly polarized nanosecond cutting signal to maintain the polarization at a parallel angle to the linearly polarized cutting direction while moving the linearly polarized nanosecond cutting signal across the at least one substrate.

21. The method of claim 1 further comprising applying a breaking force to the at least one substrate to separate the at least one substrate along the at least one cut line.

22. The method of claim 21 wherein the breaking force comprises creating a thermal stress in the at least one substrate proximate to the at least one cut line.

23. The method of claim 21 wherein the breaking force comprises creating an internal stress in the at least one substrate proximate to the at least one cut line.

24. The method of claim 21 wherein the breaking force comprises applying a mechanical force to the at least one substrate proximate to the at least one cut line.

25. The method of claim 1 further comprising:
moving at least one of the pulsed laser system and the at least one substrate while irradiating the at least one substrate with the at least one nanosecond cutting signal resulting in the at least one nanosecond cutting line controllably traversing the at least one substrate;
forming at least one device body having a device shape and at least one waste area in the at least one substrate;
forming one or more separation features in the at least one waste area; and
separating the at least one device body from the at least one waste area.

26. The method of claim 1 further comprising forming micro-fractures of a uniform transverse dimension in the at least one substrate.

27. The method of claim 1 further comprising forming micro-fractures of a non-uniform transverse dimension in the at least one substrate.

28. The method of claim 1 further comprising forming micro-fractures having a transverse dimension of about 1 μm to about 100 μm in the at least one substrate.

29. The method of claim 1 further comprising forming micro-fractures having a transverse dimension of about 10 μm to about 25 μm in the at least one substrate.

30. A method of forming a device body in transparent and semi-transparent substrates, comprising:
positioning at least one substrate on a work surface;
outputting multiple nanosecond pulsed laser signals from a pulsed laser system, each nanosecond pulsed signal having a power envelope;
adjusting a power profile within the power envelope of at least one nanosecond pulsed laser signal to form a multiple pulsed nanosecond cutting signal wherein a first pulse of the multiple nanosecond pulsed laser signals has a lower power than at least a second pulse of the multiple nanosecond pulsed laser signal;
directing the at least one nanosecond cutting signal to the at least one substrate;
forming multiple micro-fractures within the at least one substrate with the at least one nanosecond cutting signal wherein the power profile within the power envelope of the at least one nanosecond cutting signal is configured to be selectively adjusted to form individual microfractures, the individual micro-fractures forming at least one cut line defining a device body and a waste area within the at least one substrate, the individual micro-fractures formed between a first surface and second surface of the at least one substrate;
forming at least one separation feature within the waste area of the at least one substrate with the pulsed laser system; and
separating the device body from the waste area.

31. The method of claim 30 wherein the at least one substrate comprises a strengthened glass substrate.

32. The method of claim 30 wherein the at least one substrate comprises a non-strengthened glass substrate.

33. The method of claim 30 wherein the at least one substrate comprises a sapphire substrate.

34. The method of claim 30 further comprising applying a thermal separation force to the at least one substrate to separate the device body from the waste area.

35. The method of claim 30 further comprising applying a mechanical separation force to the at least one substrate to separate the device body from the waste area.

36. A method of cutting a strengthened transparent substrate, comprising:
 positioning a strengthened transparent substrate on a work surface;
 outputting multiple nanosecond pulsed laser signals from a pulsed laser system, each nanosecond pulsed laser signal having a power envelope;
 adjusting a power profile within each power profile of the nanosecond pulsed laser signal to form at least one nanosecond cutting signal wherein a first pulse of the multiple nanosecond pulsed laser signals has a lower power than at least a second pulse of the multiple nanosecond pulsed laser signals;
 adjusting the polarization of the at least one nanosecond cutting signal to form an elliptically-polarized nanosecond cutting signal having a long axis and a short axis;
 directing the elliptically-polarized nanosecond cutting signal to the strengthened transparent substrate;
 forming multiple micro-fractures within the strengthened transparent substrate with the elliptically-polarized nanosecond cutting signal wherein the power profile within the power envelope of the at least one nanosecond cutting signal is configured to be selectively adjusted to form individual microfractures, the individual micro-fractures formed between a first surface and second surface of the strengthened transparent substrate, the multiple micro-fractures forming at least one cut line in a shape within the strengthened transparent substrate;
 transposing the elliptically-polarized nanosecond cutting signal across the strengthened transparent substrate to form a device body within the strengthened transparent substrate wherein the direction of travel of the elliptically-polarized nanosecond cutting signal is orthogonal to the long axis of the elliptical polarization of the elliptically-polarized nanosecond cutting signal; and
 applying at least one breaking force to the strengthened transparent substrate to separate the strengthened transparent substrate along a cut line.

37. A method of laser cutting transparent and semi-transparent substrates, comprising:
 positioning at least one substrate on a work surface;
 outputting multiple nanosecond pulsed laser signals from a pulsed laser system, each nanosecond pulsed laser signal having a power envelope, the power envelope containing between 2 nanosecond pulsed light signals and 100 nanosecond pulse signals wherein each nanosecond pulse signal has a full width half maximum temporal width of greater than 0.0005 ns or more and less than 500 ns, wherein a first pulse of the multiple nanosecond pulsed laser signals has a lower power than at least a second pulse of the multiple nanosecond pulsed laser signals;
 adjusting at least one power profile within the power envelope of at least one nanosecond pulsed laser signal to form at least one nanosecond cutting signal;
 directing the at least one nanosecond cutting signal to the at least one substrate;
 forming multiple micro-fractures within the at least one substrate with the at least one nanosecond cutting signal, the multiple micro-fractures formed between a first surface and second surface of the at least one substrate wherein the power profile within the power envelope of the at least one nanosecond cutting signal is configured to be selectively adjusted to form individual micro-fractures, the multiple micro-fractures forming at least one cut line within the at least one substrate; and
 separating the at least one substrate along at least one cut line.

38. The method of claim 37 wherein the at least one substrate comprises a strengthened glass substrate.

39. The method of claim 37 wherein the at least one substrate comprises a non-strengthened glass substrate.

40. The method of claim 37 wherein the at least one substrate comprises a sapphire substrate.

41. The method of claim 37 further comprising selectively moving at least one of the at least one substrate and the pulsed laser system thereby permitting the at least one nanosecond cutting signal to controllably traverse a surface of the at least one substrate.

* * * * *